United States Patent
Mitchell et al.

(10) Patent No.: US 6,711,673 B1
(45) Date of Patent: Mar. 23, 2004

(54) USING A MODEL SPECIFIC REGISTER AS A BASE I/O ADDRESS REGISTER FOR EMBEDDED I/O REGISTERS IN A PROCESSOR

(75) Inventors: Charles Weldon Mitchell, Austin, TX (US); Qadeer Ahmad Qureshi, Round Rock, TX (US); Dervinn Deyual Caldwell, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/477,124

(22) Filed: Jan. 3, 2000

(51) Int. Cl.[7] .............................. G06F 9/00; G06F 12/00; G06F 12/02
(52) U.S. Cl. ..................... 713/1; 710/3; 710/9; 711/202
(58) Field of Search ............................. 713/1; 710/9, 3; 711/202

(56) References Cited

U.S. PATENT DOCUMENTS

| | | | | |
|---|---|---|---|---|
| 4,093,223 A | * | 6/1978 | Wilke et al. ................... 463/4 |
| 4,276,925 A | * | 7/1981 | Palmieri ..................... 165/205 |
| 4,727,475 A | * | 2/1988 | Kiremidjian ............... 710/104 |
| 5,257,353 A | * | 10/1993 | Blanck et al. ................ 710/36 |
| 5,359,232 A | * | 10/1994 | Eitrheim et al. ........... 327/116 |
| 5,535,420 A | * | 7/1996 | Kardach et al. .............. 710/48 |
| 5,537,602 A | * | 7/1996 | Kametani ..................... 712/38 |
| 5,729,760 A | * | 3/1998 | Poisner .......................... 710/3 |
| 5,784,615 A | * | 7/1998 | Lipe et al. .................. 709/324 |
| 5,926,646 A | * | 7/1999 | Pickett et al. ................ 712/32 |
| 5,963,738 A | * | 10/1999 | Yamaki et al. ............. 713/100 |
| 6,370,642 B1 | * | 4/2002 | Chiang et al. ................ 713/1 |

FOREIGN PATENT DOCUMENTS

| | | | | |
|---|---|---|---|---|
| EP | 575171 A2 | * | 12/1993 | ........... G06F/12/02 |
| EP | 1164490 A2 | * | 12/2001 | ........... G06F/12/06 |

OTHER PUBLICATIONS

AMD, "AMD–K6® Processor BIOS Design", Publication No. 21329, Rev. J, Feb. 1999, pp. 1–42.
AMD, "AMD K86™ Family BIOS and Software Tools Developer Guide", Mar. 1997, pp. 90–91.
AMD, "AMD–K6®–III Processor Data Sheet", Feb. 1999, pp. 37–42.

* cited by examiner

*Primary Examiner*—Thomas Lee
*Assistant Examiner*—Eric Chang
(74) *Attorney, Agent, or Firm*—Zagorin, O'Brien & Graham, LLP

(57) ABSTRACT

A processor includes an input/output (I/O) register that is mapped into input/output (I/O) address space. The processor also includes a base address register that is loaded with a base address. The base address register may be a model specific register (MSR). The input/output register is accessed with an input/output instruction at an address determined according to the base address and an offset therefrom. The base address register may be accessible to software operating at a high privilege level and not accessible to software operating at a lower privilege level, while the I/O register is accessible to software operating at the lower privilege level. The processor determines when an I/O access is to the processor I/O register and accesses that I/O register without causing an input/output bus cycle that would otherwise occur.

33 Claims, 2 Drawing Sheets

USING A MODEL SPECIFIC REGISTER AS A BASE I/O ADDRESS REGISTER FOR EMBEDDED I/O REGISTERS IN A PROCESSOR

BACKGROUND OF THE INVENTION

1. Field of the Invention

The invention relates to microprocessors and more particularly to accessing registers on a microprocessor, which are mapped into input/output memory space.

2. Description of the Related Art

In traditional x86 architectures, the processor has both memory and input/output (I/O) mapped address space. With I/O mapped I/O, registers of peripheral devices are accessed through I/O instructions, which access the registers (also referred to herein as ports) in I/O address space. A signal line (M/IO) indicates to logic external to the processor whether the processor is addressing an I/O mapped I/O port during execution of an I/O instruction or whether the processor is accessing memory (or a memory-mapped I/O port) as a result of an instruction fetch or an instruction that loads or stores data.

As levels of integration continue to increase in processors, additional I/O like functions are expected to be added to processors. It is possible that the functions could be accessed through model specific registers (MSRs). In x86 microprocessors such as the AMD-K6®-III microprocessor, model specific registers (MSRs) provide a way to utilize capabilities that may be unique to a particular microprocessor model. Examples of model-specific registers are test registers such as cache test registers. Those registers may be accessed using the read MSR (RDMSR) and write MSR WRMSR) instructions. The RDMSR instruction takes the value from an MSR specified in a first general purpose register (the "ecx" register), and places the high-order bits in a second general purpose register (the "edx" register) and the low-order bits in a third general purpose register (the "eax" register). A "WRMSR" instruction performs a write to an MSR using the same registers.

However, the use of MSRs may be undesirable because such use may lead to nonstandard solutions across different processor models. In addition, access to such registers is restricted to software having a certain privilege level. Microprocessors and operating system software provide a privilege mode environment for application software and even some system management software, which restrict which registers are accessible to such software. For example, it is known to provide four levels of privilege (0–3) with 0 being the highest. In such an environment access to MSR registers may require the software to operate at the highest privilege level (also known as ring 0). Thus, access to MSR registers through RDMSR and WRMSR instructions are limited to software operating at CPU Privilege Level=0, also referred to as ring 0. Popular operating systems such as Windows based operating systems discourage if not forbid application and system management software from using privilege level 0.

Another possible solution would be to provide additional I/O pins on the processor for the functions, so the functions could be viewed as discrete devices. However, that solution would undesirably increase processor pin count and/or potentially modify an industry standard processor pin configuration.

Therefore, it would be desirable to be able to locate additional functions in the processor as levels of integration increase, access those functions through ports mapped into I/O space and not restrict the software that accesses those registers.

SUMMARY OF THE INVENTION

Accordingly, I/O ports internal to a processor are provided that are mapped into traditional I/O address space and accessible by conventional I/O instructions.

In a first embodiment, the invention provides a method for accessing an input/output (I/O) register that is located within the processor and mapped into input/output (I/O) address space. The method includes providing a base address register in the processor and loading a base address into the base address register. The base address register may be a model specific register. The input/output register is accessed with an input/output instruction at an address determined according to the base address and an offset therefrom. In one embodiment, the base address register is accessible to software operating at a first privilege level but not by software operating at a second privilege level, while the I/O register is accessible to software operating at the second privilege level. The method may further include determining when an I/O access is made to an address within a predetermined address range, determined according to the base address and an offset therefrom and providing an indication thereof. The processor accesses the I/O register within the processor without causing an input/output bus cycle when the indication indicates the address is within the predetermined address range and generates an input/output bus cycle, for accessing an input/output register external to the processor, when the indication indicates the address is outside of the predetermined address range.

In another embodiment, the invention provides a processor that includes a base address register storing a base address. The base address register may be a model specific register. At least a first register internal to the processor is mapped into I/O address space and has an address located at an offset from the base address, the offset being greater than or equal to 0. The processor may further include a comparator coupled to compare a target address for an I/O instruction to an address range that includes the first register. The processor includes trap logic for suppressing an input/output bus cycle when the access is to the first register. In certain embodiments, the base address register is accessible to software operating at a first privilege level and not accessible to software operating at a second privilege level.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

DESCRIPTION OF THE PREFERRED EMBODIMENT(S)

Figure 1:
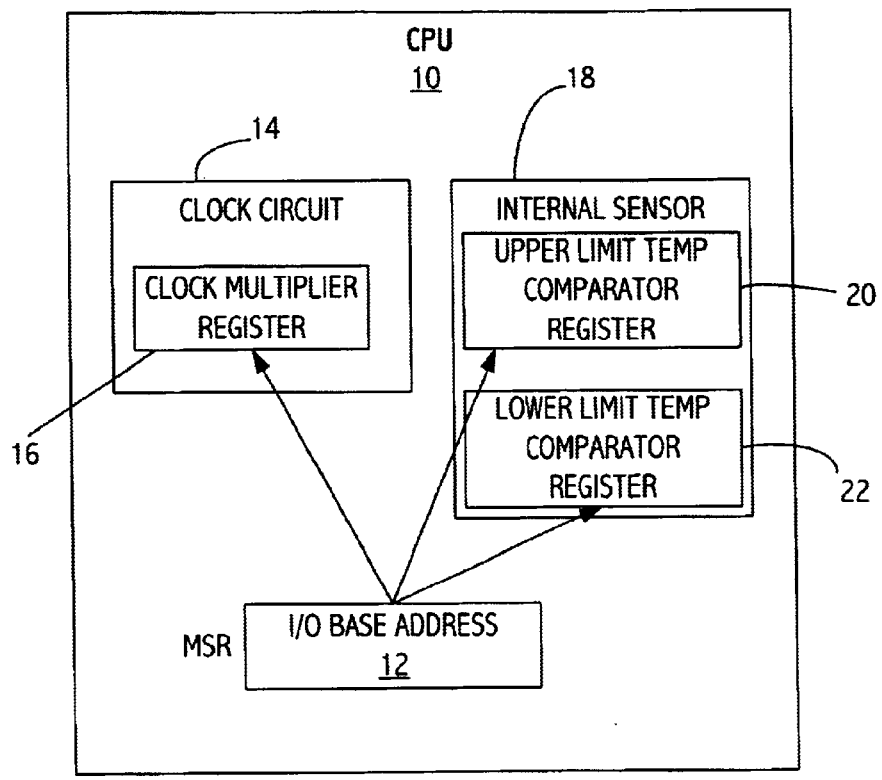
FIG. 1 illustrates a CPU having an MSR used as a base address for on-board I/O registers.

FIG. 1 illustrates a microprocessor 10 incorporating features of the present invention that allows embedded functions to be located on microprocessor 10 and be accessed as I/O ports in I/O address space. MSR register 12 functions as a base address register which is loaded with an appropriate base address during, e.g., system start-up by BIOS code. That base address is mapped into I/O address space. Various exemplary embedded functions are illustrated on CPU 10. For example, CPU 10 may include clock control circuit 14, which includes clock multiplier register 16. That register specifies the multiplication factor for a received bus clock (not shown) to determine a clock frequency for microprocessor core logic.

FIG. 1 illustrates another exemplary embedded function, temperature sensor 18, that may be incorporated into a microprocessor. Illustrated along with temperature sensor 18 are two registers 20 and 22 which set the upper and lower limit for comparing the temperature detected by the internal sensor and which may be accessed via an I/O port. Thus, for example, if the temperature is above the upper limit, that may indicate that additional cooling (e.g., a fan) needs to be turned on. A temperature below the lower limit may indicate that the CPU can dissipate more heat by running faster or by turning off the fan. Such control may be especially important in mobile environments where power dissipation is difficult due the small volume of the computer enclosure and minimum ventilation.

The internal clock multiplier register 16 and the temperature limit registers 20 and 22 are mapped into I/O space (and thus are also referred to herein as I/O ports) and therefore can be accessed by system management software operating at a low privilege level (e.g., ring 3). Each of the internal I/O ports are addressed at a separate predetermined offset from the base address. The base address is stored in base address register 12. In a simple implementation, each of the registers has a hardwired offset. In a more complex design each offset could be programmable to provide maximum flexibility for the individual embedded device.

In the illustrated embodiment, the I/O base address register 12 is a model specific register (MSR) and thus may be accessible only to software operating at the appropriately high privilege level (e.g., ring 0). It may therefore be problematic for system management software to initialize base address register 12 once the operating system (OS) is loaded. In another approach, rather than initializing base address register 12 after the OS is booted, Basic Input/Output System (BIOS) software can initialize base address register 12 during the power on sequence. Thus, the BIOS sets up the I/O base address for the embedded I/O functions in the processor that are controlled through I/O mapped I/O ports. If BIOS loads the base address register 12 during the startup sequence, before the operating system is booted, the use of privilege level 0 is not precluded by the operating system. Using BIOS at start-up to load base address register 12 in this manner is advantageous in that it is not a significant extension of BIOS functionality since BIOS already sets up the operating parameters of many I/O devices prior to booting the operating system.

Any embedded functions on board the processor requiring an I/O port may be addressed at an offset from the base address. Thus, the high order bits of the address will map to the base address while the lower order bits provide the offset. That permits multiple registers to be mapped into I/O space. In addition, since the base address loaded into the MSR is known by the BIOS, Plug and Play enumeration can be used to avoid I/O conflicts for the device addresses within the processor. Plug and Play is intended to automatically configure devices and assign resources. In the present context, a Plug and Play BIOS could change the base address in the MSR, if necessary, to avoid an I/O address conflict with an external I/O device. If individual offsets are programmable, each I/O device could be individually configured to avoid resource conflicts.

Placing the I/O base address into the MSR allows I/O ports of the embedded devices to be visible in standard I/O space that can be accessed by all software operating under Windows (or another operating system) without the software having to use a high privilege level such as ring 0.

The "internal" processor I/O ports are accessed with standard input/output instruction such as IN or OUT. However, because the processor normally performs an I/O bus cycle when executing an I/O instruction, the processor should take appropriate measures to ensure that accesses to internal I/O registers do not disrupt the system. Accordingly, the processor should detect an I/O access to an internal port and suppress the I/O bus cycle that normally occurs when an input/output instruction is executed in 'x86 architectures. That means the processor traps an I/O access to the internal I/O ports and suppresses the normal I/O bus cycle.

Assume that a block of address space is reserved in the processor for new functions. That block may be for example, 32 register locations. An access to any of those register locations (base address+ offset) should cause the trap. Note that the offset may be greater than or equal to 0. The address range is based on such factors as the size and number of the registers, whether the registers are contiguous and allowance for future growth.

Figure 2:
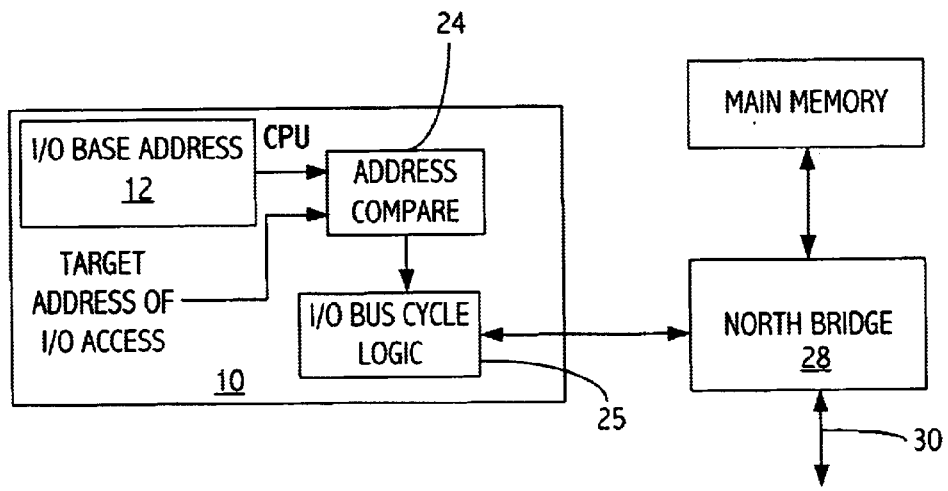
FIG. 2 illustrates a simplified block diagram of a portion of a CPU that traps on I/O instructions in a particular address range.

Referring to FIG. 2, which illustrates a high level block diagram of trap logic utilized herein, I/O base address register 12 supplies the base address to address comparator 24 which also receives the target address of a current or pending I/O access. Comparator 24 determines if the target address is an internal I/O port (within the address space delimited by the base address and the maximum offset). Address compare logic 24 supplies I/O bus cycle logic 25 with its comparison result in order for the I/O bus cycle logic to suppress or continue with a normal I/O bus cycle depending on whether the address compare logic 24 indicates that the target address of the current I/O instruction is within the internal I/O address range. If the access is within the internal I/O address range, the normal I/O bus cycle is suppressed and the IN or OUT instruction accesses the internal register, e.g., internal register 16. If it is determined that the I/O access is to address space outside of the processor, then the normal I/O bus cycle executes. The target address and data is provided to one of the chipset integrated circuits such as north bridge integrated circuit 28 which in turn accesses the appropriate I/O port over, e.g., PCI bus 30.

Figure 3:
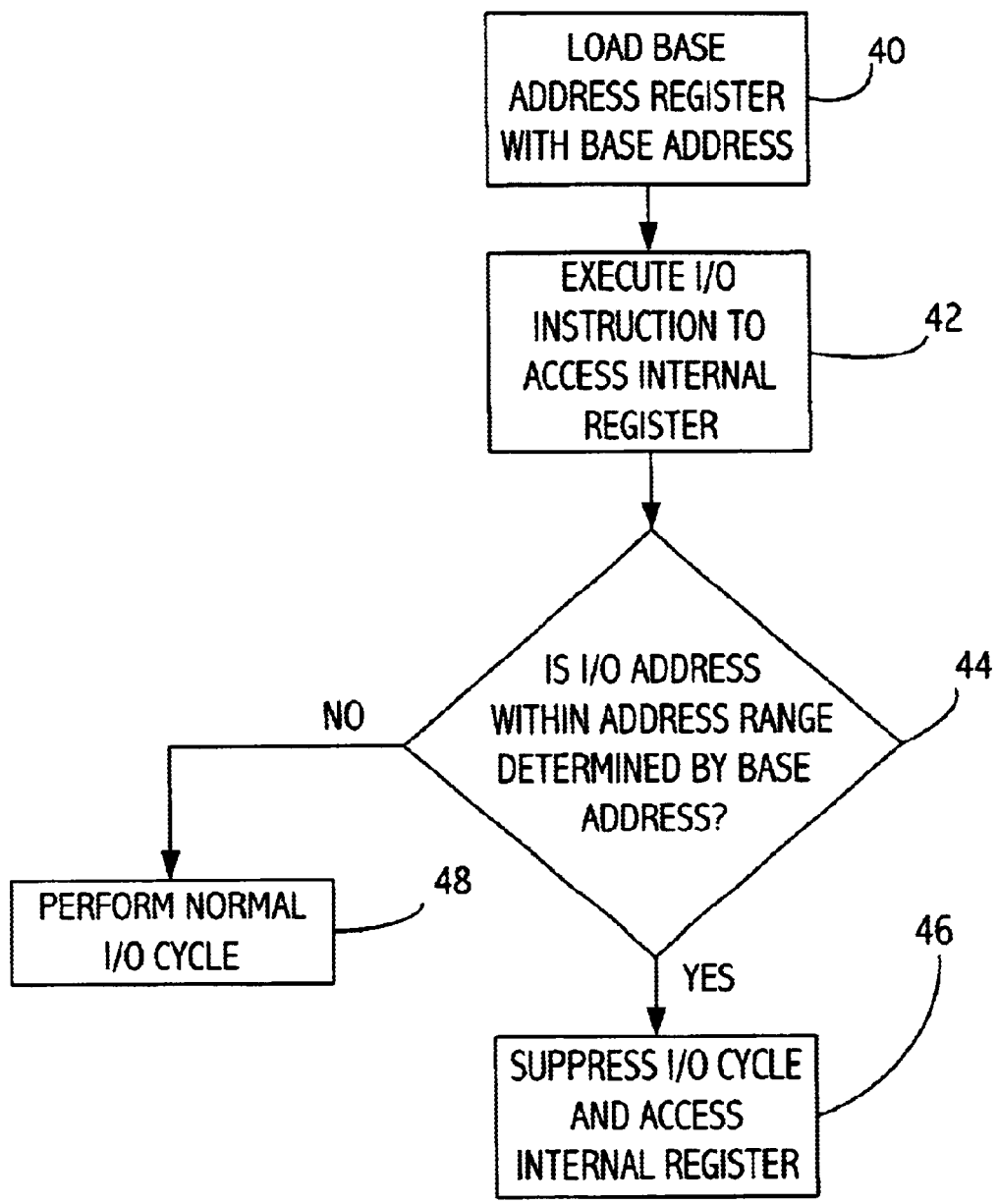
FIG. 3 illustrates a flow chart of a computer system operating in accordance with one embodiment of the invention.

Referring to FIG. 3, a flow chart illustrates an exemplary embodiment of the current invention. In step 40, the base address register is loaded with a base address. That step may be implemented in BIOS using a write MSR (WRMSR) instruction with a high privilege level. Once the base address register is set up, an ordinary I/O instruction may be executed by, e.g., system management software in 42, after the OS is booted up, to access an internal register such as clock multiplier register 16, which appears to the system as an I/O mapped I/O port. The processor hardware checks in 44 to see if the I/O address is in a predetermined address range as determined by the base address and the maximum offset. If the I/O address is within that address range, then the processor suppresses the I/O cycle and performs the access to the internal I/O register in 46. Otherwise, if the target port address for the I/O access is outside of the processor, the processor performs a normal I/O bus cycle in 48.

Thus, an apparatus and method has been described that allows embedded applications to be accessed via I/O ports accessible to software operating without high privilege levels. The description of the invention set forth herein is illustrative, and is not intended to limit the scope of the invention as set forth in the following claims. For instance, while the invention has been particularly described with respect to a processor with an x86 architecture, any processor having I/O mapped I/O ports may advantageously utilize this invention. Variations and modifications of the embodiments disclosed herein, may be made based on the description set forth herein, without departing from the scope and spirit of the invention as set forth in the following claims.

What is claimed is:

1. A method of accessing an input/output (I/O) register mapped into input/output (I/O) address space, the register being located within a processor, the method comprising:

writing a base address into a base address register in the processor; and accessing the I/O register with an input/output instruction, the I/O register having an address determined according to the base address and an offset therefrom.

2. The method as recited in claim 1 wherein the base address register is accessible to software operating at a first privilege level and not accessible to software operating at a second privilege level.

3. The method as recited in claim 2 wherein base address register is loaded with the base address during a start-up sequence.

4. The method as recited in claim 3 wherein the base address register is loaded by BIOS code during the start-up sequence.

5. The method as recited in claim 2 wherein software operating at the second privilege level has access to the input/output register.

6. The method as recited in claim 5 wherein the first privilege level is ring 0 and the second privilege level is ring 3.

7. The method as recited in claim 1 further comprising:

determining when an I/O access is to an address within an address range determined according to the base address and providing an indication thereof, accessing one of a plurality of registers within the processor without causing an input/output bus cycle when the indication indicates the address is within the predetermined address range; and accessing an input/output register external to the processor using an input/output bus cycle when the indication indicates the address is outside of the predetermined address range.

8. The method as recited in claim 1 further comprising changing the base address in the base address register to avoid an I/O conflict with another I/O device.

9. The method as recited in claim 1 wherein the register is a clock multiplier register holding a clock multiplier value.

10. The method as recited in claim 7 wherein the registers include a temperature upper limit comparator register and a temperature lower limit comparator register.

11. The method as recited in claim 7 wherein the processor includes a plurality of I/O registers located in the address range.

12. The method as recited in claim 1 wherein the input/output instruction is one of an IN and an OUT instruction.

13. The method as recited in claim 12 wherein the base address register is a model specific register (MSR).

14. A method comprising:

accessing a register on a processor using an input/output instruction, the input/output instruction being used to access input/output (I/O) mapped registers in I/O mapped address space; and trapping an access to an address range mapped into I/O address space that includes the address of the register, to prevent an I/O bus cycle from being executed.

15. The method as recited in claim 14 further comprising writing a base address register in the processor to provide a base address for any register located in the address range.

16. The method as recited in claim 14 wherein the base address register is a register accessible only to software operating at a high privilege level.

17. The method as recited in claim 14 wherein a plurality of registers are located in the address range, and the processor traps I/O instructions accessing any of the registers to prevent an I/O cycle from being executed.

18. The method as recited in claim 14 wherein the I/O accesses to the address range are 32 bit byte aligned accesses.

19. A processor comprising:

a base address register storing a base address; and at least a first register mapped into I/O address space and accessible via an input/output instruction, the first register being addressable at an address located at an offset from the base address.

20. The processor as recited in claim 19 further comprising:

trap logic, responsive to a target address for an I/O instruction, to selectively suppress an input/output cycle, the trap logic including a comparator coupled to compare the target address to the base address, and to generate an indication when the target address is within an address range based on the base address, the address range including the first register.

21. The processor as recited in claim 19 wherein the base address register is accessible to software operating at a first privilege level and not accessible to software operating at a second privilege level.

22. The processor as recited in claim 21 wherein the base address register is loaded with the base address during a start-up sequence.

23. The processor as recited in claim 22 wherein the base address register is loaded by BIOS code during the start-up sequence.

24. The processor as recited in claim 21 wherein software operating at the second privilege level has access to the input/output register.

25. The processor as recited in claim 21 wherein the first privilege level is higher than the second privilege level.

26. The processor as recited in claim 19 wherein the base address is changeable by software to avoid an I/O conflict with another I/O device.

27. The processor as recited in claim 19 wherein the register is a clock multiplier register holding a clock multiplier value.

28. The processor as recited in claim 19 further comprising a plurality of I/O registers located in an address space having a base address determined by the base address register and accessible via I/O instructions.

29. The processor as recited in claim 28 wherein the registers include a temperature upper limit comparator register and a temperature lower limit comparator register.

30. The processor as recited in claim 19 wherein the input/output instruction is one of an IN and an OUT instruction.

31. A computer system comprising:
a plurality of input/output (I/O) registers associated with respective input/output devices mapped into input/output address space and accessible via an input/output (I/O) instruction;
a processor for executing the input/output instruction, the processor including,
  a base address register for holding a base address;
  at least one processor register accessible via the input/output instruction, the processor register having an address determined according to an offset and the base address; and
  trap logic responsive to an I/O target address in the I/O instruction to suppress an I/O bus cycle when the I/O instruction addresses the processor register and wherein when the I/O instruction addresses one of the plurality of I/O registers associated with respective input/output devices at an address in I/O space and is not within a predetermined address range delimited by the base address, the trap logic allows the processor to generate an I/O cycle to access the one of the plurality of I/O registers.

32. The computer system as recited in claim 31 wherein the offset is greater than or equal to zero.

33. The processor as recited in claim 31 wherein the base address register is accessible to software operating at a first privilege level and not accessible to software operating at a second privilege level and wherein software operating at the second privilege level has access to the processor register.

* * * * *